United States Patent [19]

Dangschat

[11] 3,716,776

[45] Feb. 13, 1973

[54] HIGH VOLTAGE RESISTANT ELECTRICAL COMPONENT, IN PARTICULAR FOR COLOR TELEVISION RECEIVERS

[75] Inventor: Rainer Dangschat, Landsham, Germany

[73] Assignee: Siemens Aktiegesellschaft, Berlin and Munich, Germany

[22] Filed: April 21, 1972

[21] Appl. No.: 246,459

[30] Foreign Application Priority Data

May 19, 1971 Germany ....................P 21 24 981.0

[52] U.S. Cl. ..................................321/8 R, 317/100
[51] Int. Cl. ...............................................H02m 7/00
[58] Field of Search .....................317/99, 100; 321/8

[56] References Cited

UNITED STATES PATENTS 3,638,073 1/1972 Bernstein..............................321/8 R
3,678,366 7/1972 Tharman ..............................321/8 R

*Primary Examiner*—William M. Shoop, Jr.
*Attorney*—Carlton Hill et al.

[57] ABSTRACT

A high voltage resistant lattice-shaped electrical component employs a plurality of capacitors and diodes interconnected and arranged as a lattice structure in perpendicular lattice directions and in a direction inclined to the perpendicular directions, those elements which are arranged in a first lattice direction and both elements which are inclined thereto being disposed in one plane and the elements arranged in the second lattice direction are disposed in a plane parallel to the first mentioned plane, and at least one additional electrical element lying parallel to the elements of the second lattice direction and preferably at a distance therefrom, the elements being cast in a resin as cores of an open lattice.

4 Claims, 2 Drawing Figures

PATENTED FEB 13 1973 3,716,776

HIGH VOLTAGE RESISTANT ELECTRICAL COMPONENT, IN PARTICULAR FOR COLOR TELEVISION RECEIVERS

BACKGROUND OF THE INVENTION

1. Field of the Invention

This invention relates to a high voltage resistant electrical component, and more particularly to such a component which is designed as an open lattice structure.

2. Description of the Prior Art

In color television receivers comprising a multiplier chain, the internal impedance of the high voltage source has a load dependent characteristic. Due to the transmission characteristics of a selenium rectifier or a silicon rectifier and the changing angles of current flow, the internal impedance is, for example, 4M between 0 and 100 $\mu$A, and only 1.3M between 100 $\mu$A and 1.5mA. The large change of high voltage during the first 100 $\mu$A has the following drawbacks for picture quality; change of the picture width and picture height, change of the raster correction, and change of the focusing. In the case of interference, the high voltage may increase excessively, which endangers the picture tube and may cause the emission of harmful X-rays. Due to this, a load resistance is connected in parallel to the picture tube with semi-conductor color television devices and sometimes also with devices comprising tubes as final stages. This resistance must be constructed as a high voltage stage and therefore requires a great deal of technical circuit expenditure.

In addition, one of the capacitors of the prior art high voltage cascades having five rectifier elements and five capacitors, which is usually called a low end capacitor, is arranged and connected outside the lattice tower form of the high voltage resistant component, and later separately connected thereto. However, it would be desirable and advantageous to insert this capacitor in the lattice form, but it was not possible to enlarge the structure of the cascade due to the fixed tower dimensions and the space available for a tower in a receiver.

SUMMARY OF THE INVENTION

This invention is primarily concerned with the object of simplifying an arrangement of an impedance chain in a high voltage safe embodiment which is positioned parallel to a multiplier cascade, and to provide the same at less circuit expense. In addition, this objective includes the provision of a construction wherein the additional condenser mentioned above is arranged within the lattice form of the tower without enlarging the overall cascade structure.

According to the invention, the foregoing objects are achieved by the provision of a high voltage resistant electrical component which is designed as an open lattice shape and whose struts extend essentially in two generally perpendicular lattice directions. The component is in particular useful in color television receivers and is constructed of electrical elements which are cast without beaker in an open lattice form with artificial resin wherein the electrical elements form the cores of the struts. Several recesses are provided in the cast resin structure along each strut in the area of the high voltage resistant walls of the elements, whereby the electrical elements which are arranged in the first lattice direction, and those inclined with respect thereto, lie in one plane, while the electrical elements which are arranged in the second lattice direction are disposed in a plane parallel to the first-mentioned plane. At least one additional element is arranged parallel to the elements of the second lattice direction and preferably at a distance thereto and are cast in resin jointly with the other elements to form a combined two-fold strut of the lattice structure.

In order to realize the impedance chain within the lattice structure, the structure is provided as a high voltage resistant, open lattice component including two capacitors, respectively, arranged in an upper plane, one behind the other, and parallel to each other, while forming a voltage multiplier cascade, and with which rectifier elements are arranged in a second and lower plane spaced from and perpendicular to the two capacitors, and with which a further rectifier element is arranged in the second lower plane in a diagonal of each lower plane in a diagonal of each rectangular formed by the aforementioned elements, each rectangle being demarcated by two capacitors and two rectifiers. Resistors are arranged and connected parallel to the capacitors of at least one of the lines in the first plane, each resistor being cast together with the adjacent capacitor to form a two-fold strut of the lattice structure.

It is not necessary that the entire resistor that is to be connected in parallel be inserted into the high voltage cascade in the form of two resistors arranged one behind the other, but a part of the entire resistor may also be realized by means of resistor elements arranged outside of the cascade, as long as the voltage dropped thereat remains sufficiently low in order to avoid difficulties with high voltage safety and insulation.

For the insertion of the capacitor, which hitherto had been arranged outside of the component, into such a voltage multiplier cascade, the present invention provides that parallel to the capacitors of the direct voltage side of the structure, and staggered toward the inside of the structure and in the same plane, the fifth capacitor which is required for the complete construction of a voltage multiplier cascade is arranged at a distance symmetrical to the capacitors of the direct voltage side and cast in jointly therewith to form a continuous column of the component.

BRIEF DESCRIPTION OF THE DRAWINGS

The invention, its organization, construction and operation will be best understood from the following description of preferred embodiments thereof taken in conjunction with the accompanying drawing, in which.

DESCRIPTION OF THE PREFERRED EMBODIMENTS

Figure 1:
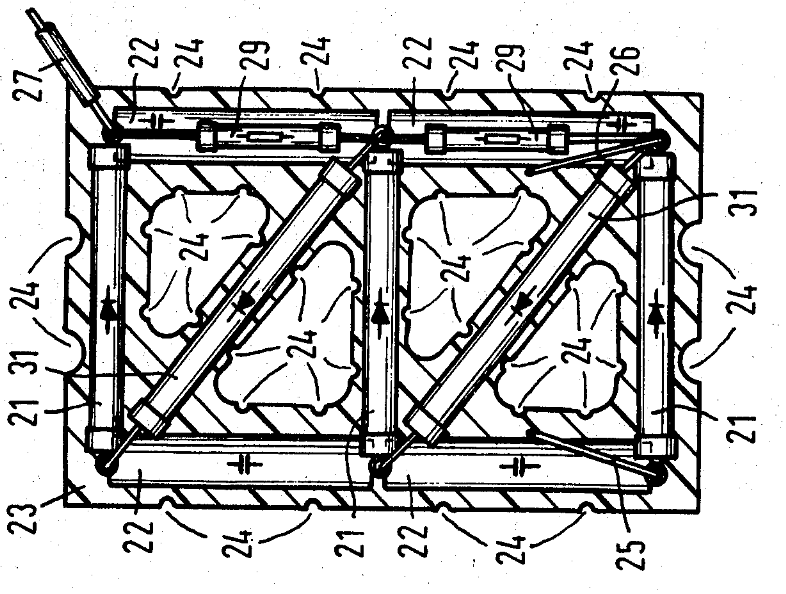
FIG. 1 is a sectional elevational view of a high voltage cascade constructed according to the teachings of the present invention.

FIG. 1 illustrates a high voltage cascade according to the invention for the production of acceleration voltage of about 25kV which is required for color picture tubes. The cascade comprises five selenium rectifiers 21, 31 and five capacitors 22, the fifth capacitor (not illustrated) not being included within the structure but separately connected thereto. A plurality of connecting wires 25, 26 and 27 extend through the artificial resin casing 23 to the exterior of the unit. The connection wires 25 and 26 are on the base side of the unit and are extended upwardly in the casing 23 so that at the point of exit from the unit they are a sufficient distance from the base side which is usually connected to the chassis and therefore are spaced from the chassis.

A plurality of recesses 24 in the artificial resin casing 23 are illustrated in exaggerated form adjacent the high voltage resistant wall portions of the electrical elements. These recesses are formed during the production of the component according to this invention when the component elements which are interconnected together to form a loose lattice are inserted into a form comprising a material such as polyethylene or polypropylene which does not combine with the resin, for example an epoxy resin. Small spacing blocks are arranged in the interior of the form and are advantageously pointed in the direction of the form and arranged and dimensioned in such a way that they guarantee sufficient distance between voltage carrying metal parts and the inner form walls when the loose lattice of elements is inserted. Due to the tolerances which are required and which provide for a simple insertion of the lattice, not all component elements will be in contact with all spacing blocks provided for centering so that recesses 24 in the resin casing 23 do not all extend to the high voltage resistant wall of the individual inserted elements. In FIG. 1, this factor has been taken into account in the illustration of different depths of such recesses.

In addition to the above described multiplier cascade itself, two high value resistors 29 are disposed parallel to the capacitors 22 between the high voltage connection 27 and the focus connection 26 in such a way that they are in the same plane as the rectifiers 21, 31, whereby recapacitors 22 are cast with the respective resistors 29 to form a two-fold strut.

Figure 2:
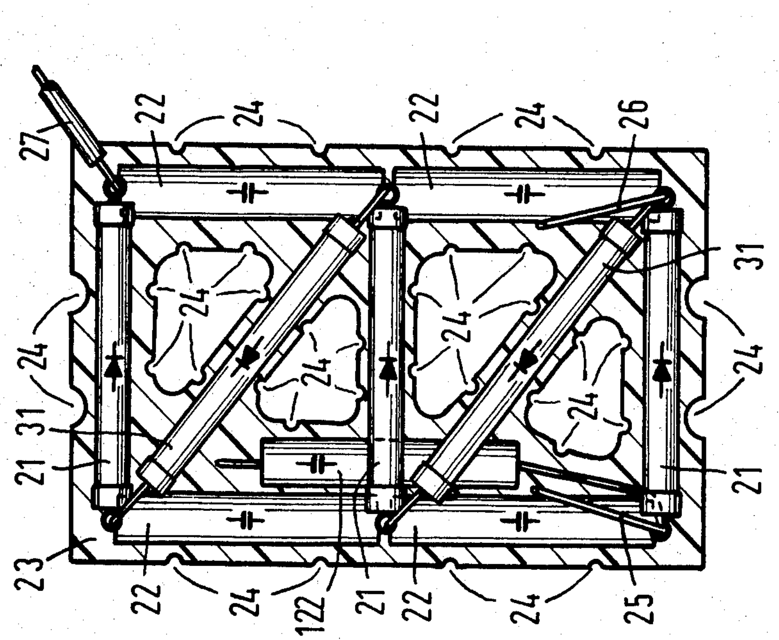
FIG. 2 is a sectional elevational view of a high voltage multiplier cascade, also constructed in accordance with the principles of the present invention.

In FIG. 2, a voltage multiplier cascade similar to that illustrated in FIG. 1 is shown wherein the resistors 29 have been replaced by the fifth capacitor 122 which is required for the construction of a multiplier circuit.

At this point it should be pointed out that, of course, a component which comprises both the fifth capacitor and the resistor chain as illustrated in FIG. 1 is also possible.

The arrangement according to the present invention entails an essential simplification and saving with respect to the heretofore known common separate design of the resistor chain which is to be connected parallel to the cascade, since the separate design of this chain as a high voltage resistant component caused essentially higher costs, aside from the complicated production thereof and, in addition, result in a device which required additional space.

Furthermore, the construction of a cascade with the fifth capacitor included therein is essentially more advantageous and simple with respect to the previous separate externally attached construction.

An advantage not hereinbefore mentioned resides in the good heat dissipation characteristic of the lattice shaped component.

Although I have disclosed my invention by reference to specific illustrative embodiments thereof, and many changes and modifications thereof may become apparent to those skilled in the art without departing from the spirit and scope of my invention and it is to be understood that I intend to include within the patent warranted hereon all such changes and modifications as may reasonably and properly be included within the scope of my contribution to the art.

I claim:

1. A high-voltage resistant, lattice shaped electrical component of the type having struts which extend in first and second directions which are perpendicular to each other and in a third direction which is inclined with respect to the two perpendicular directions, the component comprising a plurality of electrical elements which are interconnected and form the lattice shape, said struts comprising resin and the electrical elements as cores of the resin, the electrical elements which extend in the first direction lying in a first plane and the electrical elements which extend in the second direction and those which extend in the inclined direction lying in a second plane parallel to the first plane, the improvement therein comprising at least one additional electrical element lying parallel to and spaced from the elements of the first direction and connected in circuit with the other electrical elements, said additional element also disposed as a core of a strut to form a two-fold strut of the lattice shaped electrical component.

2. A high-voltage resistant, lattice shaped electrical component according to claim 1, wherein said plurality of electrical elements defined a multiplier cascade comprising first and second pairs of serially connected capacitors, each pair disposed in parallel lines in the first plane, five rectifiers disposed in the second plane, three of the rectifiers disposed perpendicular to the capacitors and connecting the capacitors to form two rectangles, the other two rectifiers lying across diagonals of the respective rectangles and connected to the respective capacitors and rectifiers which terminate at the corresponding corners of the rectangles, the improvement further defined wherein said at least one additional electrical element comprises a pair of resistors disposed parallel to the capacitors and adjacent and spaced from one pair of the capacitors, said resistors connected in parallel with the adjacent capacitors and encased in the resin therewith to form the two-fold strut.

3. A high-voltage resistant, lattice shaped electrical component according to claim 1, wherein said plurality of electrical elements defines a multiplier cascade comprising first and second pairs of serially connected capacitors, each pair disposed in parallel lines in the first plane, five rectifiers disposed in the second plane, three of the rectifiers disposed perpendicular to the capacitors and connecting the capacitors to form two rectangles, the other two rectifiers lying across diagonals of the respective rectangles and connected to the respective capacitors and rectifiers which terminate at the corresponding corners of the rectangles, the improvement further defined wherein said at least one additional electrical element comprises a fifth capacitor disposed parallel to the capacitors and adjacent and spaced from one pair of the capacitors, said fifth capacitor connected to one of the aforementioned corners and encased in the resin with the adjacent capacitors to form the two-fold strut.

4. A multiplier cascade according to claim 3, wherein said fifth capacitor is further symmetrically disposed with respect to the adjacent pair of capacitors on a direct voltage side of said cascade.

* * * * *